United States Patent [15] 3,706,854
Dickson et al. [45] Dec. 19, 1972

[54] PERFORMANCE MONITOR UNIT FOR FREQUENCY MULTIPLEXED HF MODEMS

[72] Inventors: Robert L. Dickson; George B. Johnson, both of San Diego, Calif.; Kirby W. Hansen, Jr., Springfield, Va.

[73] Assignee: The United States of America as represented by the Secretary of the Navy

[22] Filed: Jan. 14, 1971

[21] Appl. No.: 106,522

[52] U.S. Cl. ..................................179/15 BT, 325/56
[51] Int. Cl. ..............................H04b 7/02, H04l 1/04
[58] Field of Search..........325/30, 31, 40, 41, 50, 56, 325/154, 320, 325, 304; 179/15 BT

[56] References Cited

UNITED STATES PATENTS

| | | | |
|---|---|---|---|
| 3,310,742 | 3/1967 | Adams | 325/154 X |
| 3,422,357 | 1/1969 | Browne | 325/56 X |
| 3,409,875 | 11/1968 | Jager et al. | 325/41 X |
| 3,462,554 | 8/1969 | Steel, Jr. | 325/56 X |
| 3,526,837 | 9/1970 | Zegers et al. | 325/41 |

*Primary Examiner*—Donald J. Yusko
*Attorney*—R. S. Sciascia, George J. Rubens and J. W. McLaren

[57] ABSTRACT

In an HF digital communications system, apparatus for monitoring the error rate of frequency multiplexed FSK transmissions. Transmitted tones carrying mark-space sequence signals are twinned, i.e., transmitted using frequency-diversity, to provide in-band diversity reception which is utilized to provide simple, comparative performance measurements of approximate bit error rates between the two twinned tones, or between two or more different twinned pairs of tones. At the receiving end of the system, each of the two frequency-diversity tones is separately demodulated by a different tone converter into a digital bit stream. The two resultant bit streams are then compared with respect to the transmitted mark-space sequence signals in a single-channel mode. The mark-space sequence signals are subtracted and counted in a pulse sorter which produces an output pulse whenever a difference greater than a selectively predetermined value arbitrarily defined as a bit error is detected. Twinned tones or systems are then compared by counting the number of pulses occurring during a predetermined time period.

2 Claims, 2 Drawing Figures

INVENTORS
ROBERT L. DICKSON
GEORGE B. JOHNSON
KIRBY W. HANSEN JR.
BY
George J. Rubens

PERFORMANCE MONITOR UNIT FOR FREQUENCY MULTIPLEXED HF MODEMS

BACKGROUND OF THE INVENTION

Digital communications systems require apparatus for estimating the current digital error rate of the receiver without using special transmissions, without knowledge of the data being transmitted, and without interrupting traffic flow. Devices for performing this or similar functions are known as performance monitor units (PMU). As an element of an adaptive communication system, a PMU can be used to determine when adaptive change is needed and by comparing the error rates which would result from the various available choices of adaptation, to select the best change to be made at any time.

A simple technique involves counting errors directly; however, this requires that the transmissions contain redundancy either in the form of a test message known to the receiver or parity check digits in an error detection code. Furthermore when the actual error rate is very low, an unacceptably long period of time may be required to count enough errors to provide a reliable estimate of the actual error rate. Prior methods and devices for estimating data quality have also required costly, elaborate, synchronized sequence generators at the transmission and receiver sites which require valuable traffic channels in frequency multiplex communication systems.

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

A performance monitor unit (PMU) which can be used to advantage with adaptive HF communications systems is disclosed. The apparatus provides comparative indications of the quality of frequency-multiplexed FSK signals whereby operating personnel can determine which frequency or tone in a broadcast ensemble offers the minimum bit error rate (BER). In essence, normal traffic on multiplexed (MUX) tones is compared to provide approximate relationships between the bit error rate of two twinned tones or the relative BER rate between two or more twinned pairs of tones. In operation, frequency multiplexed signals are transmitted in a frequency-diversity mode whereby the same information is provided on two different frequency tones. Using in-band, diversity reception, each of the two twinned tones is separately demodulated into a digital bit stream. The two bit streams are then compared in a single-channel mode by circuitry which produces a pulse having a pulse width equal to the difference between the two bit streams with respect to mark-space sequences. Pulse sorter circuitry then produces an output pulse every time a selectively predetermined difference arbitrarily defined as a bit error between the two bit streams is detected. Twinned pairs of tones can be compared with respect to each other by comparing the number of output pulses, i.e., bit errors, counted during simultaneous transmissions.

OBJECTS OF THE INVENTION

It is the primary object of the present invention to provide a performance monitor unit (PMU) for estimating the digital error rate of HF multiplex broadcasts in adaptive communication systems.

It is another object of the present invention to provide a performance monitor unit for use with adaptive communications systems without the use of special transmissions and without interrupting normal traffic flow.

Other objects, advantages and novel features of the invention will become apparent from the following detailed description of the invention when considered in conjunction with the accompanying drawings wherein:

DESCRIPTION OF THE PREFERRED EMBODIMENT

The present invention will be described with reference to a multi-channel teletype system which essentially comprises receivers, transmitters, and modulator-demodulators (Modems) of the type that can be combined to achieve, through the use of single-sideband techniques, a 16-tone package which is transmitted within a 3-kHz frequency assignment. Each of the 16 tones is FSK modulated with approximately a ±42.5 hZ shift. Successive sender frequencies spacings are provided at 170 hZ so that it is possible to pass teletype information on sixteen independent channels or to combine the tones in frequency-diversity pairs on eight information channels. However it should be clearly understood that although only four tones, $f_1$, $f_2$, $f_3$, and $f_4$, are shown in FIG. 1, the invention can find utility and advantage with any frequency multiplexed, FSK digital communications system.

Figure 1:
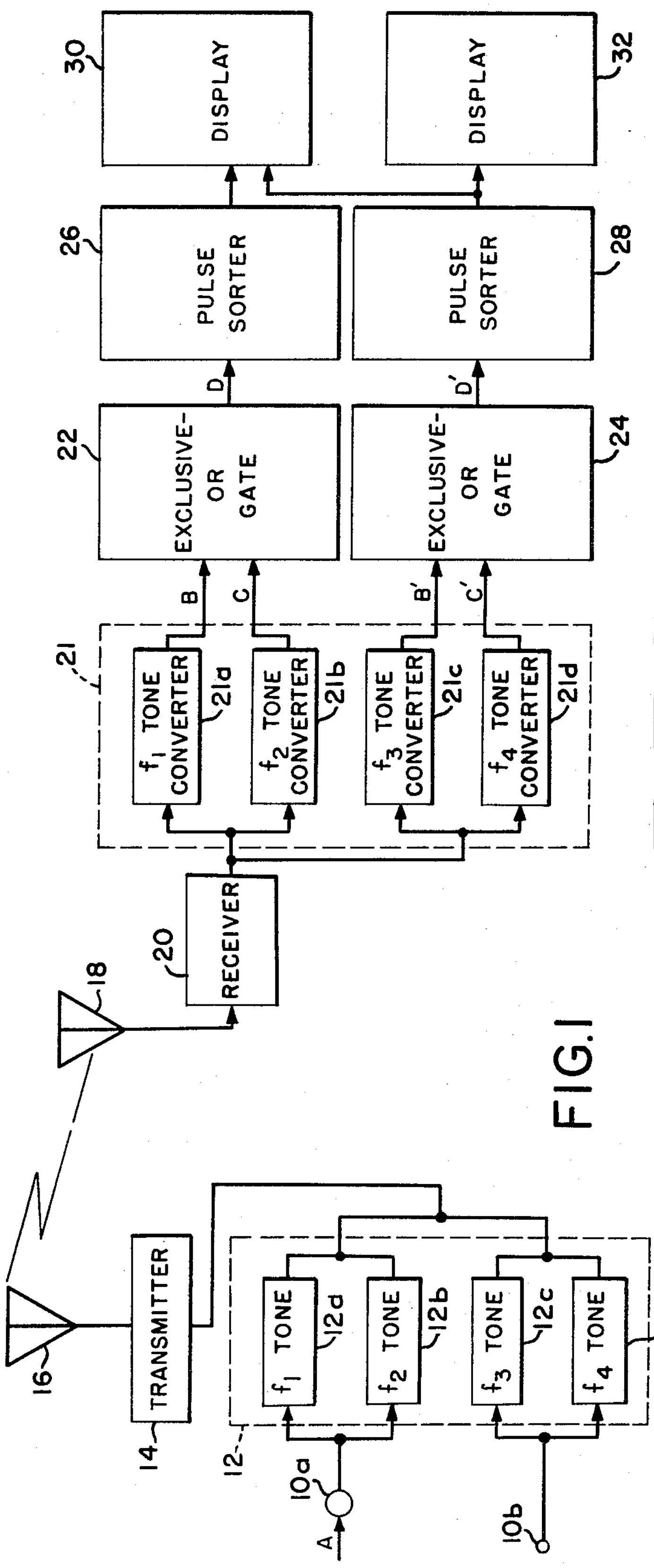
FIG. 1 is a simplified schematic block-diagram of the novel performance monitor unit disclosed herein in combination with an adaptive HF communications system; and, FIG. 2 is a graphic illustration of typical waveforms developed in the system of FIG. 1.
Figure 2:
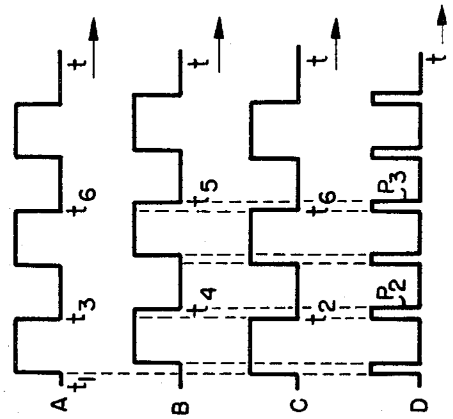

In FIG. 1, input terminals **10*a* and 10*b* are adapted to receive input mark-space sequence signals having waveforms as shown in FIG. 2. The input signals are transferred to a multi-channel modulator system 12. The output of the modulator 12 is transmitted by the transmitter 14 and the transmitting antenna 16** over a digital data link.

The transmitted signals are received at a receiver station by a receiver antenna 18 which couples the received signals to a receiver 20. The output of the receiver 20 is then fed into a multi-channel demodulator system 21. The demodulator 21 produces two pairs of output digital bit streams, B and C, and B′ and C′ which are coupled to the Exclusive-OR gates 22 and 24, respectively. The outputs D and D′ from the gates 22 and 24 are coupled to the conventional pulse sorters 26 and 28, respectively and the outputs from the pulse sorters are coupled to the conventional display devices 30 and 32.

In operation an input signal in the form of a mark-space sequence, A, is fed to the input terminal **10*a*** thereby coupling the signal to a modulator 12. In the modulator 12, two separate and distinct tone channels, 12*a* and 12*b*, are "twinned" so that the input signal A is put on both frequency tones, $f_1$ and $f_2$ for frequency-diversity transmission. For example, the frequency tone $f_1$ could comprise a 425 hZ signal and the frequency tone $f_2$ could comprise a 1,795 hZ signal. The twinned tones from the modulator 12 are then transmitted by the transmitter 14 and the antenna 16 as a frequency-diversity, in-band, frequency multiplexed tone.

At the receiving end of the communications data link system, the transmitted signals are received by the receiving antenna 18. The received signals are coupled to a conventional receiver 20 which detects the signal. The detected output of the receiver 20 is then coupled to a demodulator 21. The demodulator 21 includes at least two tone converter channels 21*a* and 21*b*. The tone converter channels 21*a* and 22*a* demodulate, in a single channel mode, the frequency-diversity transmitted tones $f_1$ and $f_2$, respectively. That is, the converter channels 21*a* and 21*b* produce the digital bit streams B and C in response to the tones $f_1$ and $f_2$, respectively.

The bit streams B and C are fed into a conventional Exclusive-OR gate 22 which functions as a modulo-two adder to compare the waveforms B and C with respect to the mark-space sequences of each. The gate 22 thus produces a positive output pulse D whenever the two bit streams B and C differ relative to each other a selectively predetermined amount. That is, the width of the pulses in the waveform D is substantially equal to the amount of time that the two bit streams B and C differ from each other with respect to corresponding mark-space sequences.

For example, by way of illustration, it can be seen from FIG. 2, that the input signal A has a pulse-width equal to $t_3$–$t_1$. The pulse-widths of bit streams B and C, however, are not equal to $t_3$–$t_1$. Rather, both have pulse widths slightly different from signal A, and both bit streams C and D are time displaced with respect to the signal A. Thus it can be seen that the output of the gate 22 comprises a pulse which is substantially equal to the time difference between corresponding pulses of the bit streams B and C. For example, the pulse width or duration of the second pulse $P_2$ of waveform D is equal to $t_4$–$t_2$, and the pulse width of pulse $P_3$ is equal to $t_6$–$t_5$, etc.

The output D from the Exclusive-OR gate 22 is fed into a conventional pulse sorter 26 which produces an output pulse every time the input pulse D has a pulse width longer than a selectively predetermined time period such as, for example, 6 milliseconds or one half baud. The output of the pulse sorter 26 can then be coupled to any one of various types of display or counting devices 30.

Obviously the same procedure could be simultaneously or otherwise performed on $f_3$, $f_4$ tone pair whereby the quality of the $f_1$, $f_2$ tone pair could be compared with respect to the quality of the $f_3$, $f_4$ tone pair by comparing the relative bit error rates of the two tone pairs over a predetermined period of time. As can be seen from FIG. 1, the outputs from the pulse sorters 26 and 28 can be applied to the same or different display devices to accomplish the above comparison.

It should be appreciated that it has been experimentally determined that over a useful BER range, an approximately linear relationship exists between the average BER of single-channel transmissions and the number of bits which differ between two twinned, single-channel multiplexed bit streams. This emperically derived relationship provides the basis for the simple comparative performance measurements described above. Thus by comparing the count of the number of bits which differ between two twinned, single-channel multiplexed bit streams, a quality estimation can be derived.

The novel device disclosed herein can be used to advantage in a communications system such as the Navy HF multiplex fleet broadcast system as a quality monitor for multiplexed fleet broadcast reception. Obviously an estimation of bit error rate between twinned channels is faster and more reliable than visual examination of teletype printout and furthermore it can permit comparison of alternatives such as change of frequencies, to improve transmission accuracy.

If a timing pulse in synchronism with the incoming bit stream transmitted over the digital data link were available, discrete mark space sequences could be generated and compared by means of the Exclusive-OR logic gate 22. However, in the absence of a timing pulse, continuous mark-space sequences are compared and the pulse sorter 26 is used to distinguish between random fluctuations in the mark-space transition times and discrepancies in the order of a baud, for example, are noted. A baud is used for comparison purposes since the tone package previously described consists of 16 tones, each carrying 75 band FSK mark-space information.

Exclusive-OR gate 22, and the pulse sorter 26 can comprise analog devices, and if no numerical printout is required on the display device 30, an analog readout device could be used.

Thus it can be seen that a performance monitor unit for frequency multiplexed, FSK HF transmissions has been disclosed. The unit does not require special transmissions for synchronization, equipment is relatively simple, and the unit is very reliable insofar as estimating bit error rate and for selecting the broadcast frequency having the lowest BER over a useful range of BER. Broadcast multiplexed channels which are twinned for in-band diversity reception, are demodulated separately and mark-space frequencies are compared. Errors are assumed where the sequences are not identical. An asynchronous system can be accommodated by subtracting the mark-space sequences and using a pulse sorter to count pulses longer than a selectively predetermined pulse width.

Obviously many modifications and variations of the present invention are possible in the light of the above teachings. It is therefore to be understood that within the scope of the appended claims the invention may be practiced otherwise than as specifically described.

What is claimed is:

1. In HF digital modems, apparatus for determining the bit error rate of frequency-multiplexed, FSK signals comprising:

transmitter means for transmitting a plurality of said signals in a frequency-diversity, in-band mode wherein each of said signals comprises different mark-space sequence transmitted on two different frequency tones;

remote means for receiving and detecting said signals;

said remote means including multi-channel means comprising a plurality of different pairs of tone-converter means for demodulating in a single-channel mode each of said signals to produce two bit streams substantially identical to the corresponding mark-space sequence in response to each of said signals and its corresponding two frequency tones;

logic gate means for comparing in a single-channel mode the pulse width of each of said two bit streams with respect to each other and for producing an output having a pulse width substantially equal to the pulse width difference between said two bit streams;

pulse sorter means responsive to said output to produce a bit error pulse when said output pulse width exceeds a selectively predetermined difference; and, indicator means for counting and displaying said bit error pulses.

2. The apparatus of claim 1 wherein said logic gate means comprise a plurality of exclusive-or gates.

* * * * *